United States Patent
Bian et al.

(10) Patent No.: US 11,858,630 B2
(45) Date of Patent: Jan. 2, 2024

(54) PLANTING SYSTEM HAVING OSCILLATING SEED AGITATOR

(71) Applicant: BioCarbon Engineering Ltd., Oxford (GB)

(72) Inventors: Shuning Bian, Sydney (AU); Jeremie Leonard, Oxford (GB); Hannah Redrup, Sutton Coldfield (GB)

(73) Assignee: BIOCARBON ENGINEERING LTD., Oxford (GB)

( * ) Notice: Subject to any disclaimer, the term of this patent is extended or adjusted under 35 U.S.C. 154(b) by 529 days.

(21) Appl. No.: 16/790,504

(22) Filed: Feb. 13, 2020

(65) Prior Publication Data

US 2021/0253249 A1    Aug. 19, 2021

(51) Int. Cl.
| | |
|---|---|
| *B64D 1/02* | (2006.01) |
| *B64C 39/02* | (2023.01) |
| *A01C 7/08* | (2006.01) |
| *B64U 101/00* | (2023.01) |

(52) U.S. Cl.
CPC ............... *B64D 1/02* (2013.01); *A01C 7/085* (2013.01); *B64C 39/02* (2013.01); *B64U 2101/00* (2023.01)

(58) Field of Classification Search
CPC ........... B64D 1/02; A01C 7/085; B64C 39/02; B64C 2201/12
See application file for complete search history.

(56) References Cited

U.S. PATENT DOCUMENTS

| | | | |
|---|---|---|---|
| 1,823,637 A * | 9/1931 | Wright | A23C 3/031 99/461 |
| 2,796,202 A | 6/1957 | Lawrence et al. | |
| 2,811,287 A | 10/1957 | Sackett | |

(Continued)

FOREIGN PATENT DOCUMENTS

| | | |
|---|---|---|
| CN | 103481372 A | 1/2014 |
| CN | 206760016 U | 12/2017 |

(Continued)

OTHER PUBLICATIONS

Examination report No. 1 from related Australian Patent Application No. 2020201764 dated Nov. 30, 2020 (10 pages).

(Continued)

*Primary Examiner* — Benjamin P Lee
(74) *Attorney, Agent, or Firm* — Womble Bond Dickinson (US) LLP (57) ABSTRACT

An agitator, a planting system including the agitator, and methods of using the agitator to agitate seeds in a hopper, are described. The agitator can be mounted within the hopper of the planting system. The hopper can be transported by an unmanned aerial vehicle to spread the seeds over a geography. The agitator can include one or more arms that oscillate through a sweep angle to move one or more paddles through the seeds. An outlet of the hopper can be within the sweep angle such that the arms and paddles sweep seeds into the outlet as the arms oscillate within the hopper. The sweep angle can vary over time by incrementally increasing the sweep angle during several stages. The varying sweep angle maintains consistent seed mixing and spreading over time. Other embodiments are also described and claimed.

18 Claims, 6 Drawing Sheets

(56) References Cited

U.S. PATENT DOCUMENTS

| | | | | |
|---|---|---|---|---|
| 3,415,423 | A * | 12/1968 | Bowser | C10B 31/04 |
| | | | | 222/244 |
| 3,633,796 | A * | 1/1972 | Zweegers | A01C 7/20 |
| | | | | 222/371 |
| 3,645,507 | A * | 2/1972 | Birdsall | A01D 90/00 |
| | | | | 366/276 |
| 3,806,003 | A * | 4/1974 | Fujimoto | B01F 31/445 |
| | | | | 118/308 |
| 3,897,210 | A * | 7/1975 | Gruber | A61L 2/20 |
| | | | | 99/474 |
| 4,030,428 | A * | 6/1977 | Truax | A01C 7/16 |
| | | | | 111/926 |
| 4,155,315 | A * | 5/1979 | Dobbins | A01C 7/085 |
| | | | | 111/8 |
| 4,167,248 | A * | 9/1979 | Akazawa | B05B 7/145 |
| | | | | 222/242 |
| 4,260,108 | A * | 4/1981 | Maedgen, Jr. | B64D 1/18 |
| | | | | 222/161 |
| 4,537,333 | A * | 8/1985 | Bjerregaard | G01F 11/24 |
| | | | | 222/368 |
| 6,454,143 | B1 * | 9/2002 | Young | A01M 9/00 |
| | | | | 222/565 |
| 9,852,644 | B2 | 12/2017 | Salnikov et al. | |
| 10,377,491 | B1 * | 8/2019 | Fine | B64C 39/024 |
| 11,027,294 | B2 * | 6/2021 | Roy | B05B 3/0409 |
| 11,066,167 | B2 * | 7/2021 | Bennett | A01B 79/00 |
| 2003/0070399 | A1 * | 4/2003 | Wingert | A01F 25/183 |
| | | | | 53/567 |
| 2008/0092802 | A1 * | 4/2008 | Henderson | G01L 5/26 |
| | | | | 116/212 |
| 2010/0097882 | A1 * | 4/2010 | Uhlenkamp | B01F 31/443 |
| | | | | 366/243 |
| 2015/0164044 | A1 * | 6/2015 | Powers | A01K 5/0225 |
| | | | | 119/61.5 |
| 2016/0307448 | A1 * | 10/2016 | Salnikov | G05D 1/104 |
| 2019/0037828 | A1 * | 2/2019 | Bennett | A01B 79/00 |
| 2019/0071177 | A1 * | 3/2019 | Zvara | B64D 1/08 |
| 2020/0137946 | A1 * | 5/2020 | Chang | B64D 1/02 |
| 2020/0307791 | A1 * | 10/2020 | Feng | B64C 39/024 |
| 2021/0182978 | A1 * | 6/2021 | Nissing | A01B 79/02 |
| 2021/0283639 | A1 * | 9/2021 | Zvara | B05B 13/005 |
| 2021/0333259 | A1 * | 10/2021 | Andrejuk | B64C 39/024 |
| 2022/0007567 | A1 * | 1/2022 | Reabow | A01C 7/127 |
| 2022/0117150 | A1 * | 4/2022 | Hale | B64D 1/02 |

FOREIGN PATENT DOCUMENTS

| | | | | |
|---|---|---|---|---|
| CN | 107902091 | A | | 4/2018 |
| CN | 109648713 | A | | 4/2019 |
| CN | 208931642 | U | * | 6/2019 |
| CN | 208963317 | U | | 6/2019 |
| CN | 112492944 | A | * | 3/2021 ......... A01C 17/001 |

OTHER PUBLICATIONS

Examination report No. 2 from related Australian Patent Application No. 2020201764 dated Jun. 16, 2021 (8 pages).
Examination report No. 1 from related Australian Patent Application No. 2021277629 dated May 16, 2023 (6 pages).

* cited by examiner

| Stage | Time (s) | Sweep Angle (degrees) | Oscillatory Speed (sweeps/min) |
|---|---|---|---|
| 1 | 90 | 60 | 12000 |
| 2 | 60 | 70 | 10286 |
| 3 | 29 | 80 | 9000 |
| 4 | 2 | 120 | 6000 |

PLANTING SYSTEM HAVING OSCILLATING SEED AGITATOR

BACKGROUND

Field

The present disclosure relates to systems for dispensing particles. More specifically, the present disclosure relates to planting systems for dispensing seeds.

Background Information

There are existing techniques for dispensing particles, such as fertilizer or seed, in both agricultural and non-agricultural endeavors. For example, crop planters exist that dispense agricultural seeds to produce crops. Such planters commonly have a seed container that holds the seeds prior to dispensing the seeds through a metering system. The crop planters may have one or more agitators located within the seed container to agitate and transfer the seeds from the seed container to the metering system. The agitators are typically horizontal augers that operate with uniform motion, e.g., uniform circular motion. More particularly, the augers typically rotate constantly in a single rotational direction about a horizontal axis extending through the seed container.

Non-agricultural endeavors, such as reseeding to revegetate geographies that have been negatively impacted by influences such as fire, over-grazing, etc., can also utilize planting systems. The planting systems can spread non-agricultural seeds, such as native grass seeds, over the geography, rather than spread agricultural seeds within well-defined crop boundaries. Non-agricultural seeds, such as native grasses, can differ morphologically from agricultural seeds, such as millet. Thus, the conventional agitators developed for agricultural use may interact differently with the non-agricultural seeds.

SUMMARY

Conventional agitators, e.g., spinning augers, have been found to poorly agitate native grass seeds, such as Australian grass seeds. The native grass seeds can have a morphology that causes them to bind together, and the constant rotational motion of the auger may fail to agitate the grass seeds sufficiently to cause the seeds to enter the metering system. More particularly, when native grass seeds are held in a seed container and agitated by a horizontal auger, the seeds compress against the sides of the seed container and form compacted columns along the container interior sides. The compressed seeds bind together and do not slide into the metering system located at a base of the seed container. More particularly, the compacted columns resist being broken up by the auger, and increased power input to the auger may be required to disrupt the interlocked seeds and cause the seeds to flow toward the container exit. If insufficient torque is applied, the seeds may become trapped in the seed container and fail to exit through the metering system. Increasing power input under certain conditions, however, may not be possible. For example, the auger may be driven by a tractor or aerial vehicle having limited torque output. Under such conditions, conventional agitators will fail to adequately agitate the seeds, which may result in inconsistent or insufficient seeding of a target geography.

A planting system, such as a seed spreader, and an agitator for use in the planting system, is provided. More particularly, the planting system includes a low-torque, non-uniform motion sweep agitator that can operate with reduced torque input, and can successfully agitate and mix seeds to promote consistent seed spreading. In an embodiment, the planting system includes a hopper containing seeds, e.g., native Australian grass seeds. The planting system also includes an agitator to mix the seeds within the hopper. For example, the agitator may be mounted within the hopper and may include an arm to oscillate through a sweep angle. A paddle can extend from the arm to increase a mixing surface area. An outlet of the hopper can be within the sweep angle, and thus, as the arm sweeps past the outlet, the arm and/or paddle can move seeds toward and through the outlet. The hopper can be mounted on an unmanned aerial vehicle (UAV), and thus, the UAV can carry the hopper over a target geography such that the seeds are dispensed over the target geography.

The agitator arm can operate non-uniformly in both space and time. The arm can oscillate back and forth through a sweep angle, and thus, can have non-uniform oscillatory motion in contrast to the uniform circular motion of an auger. Furthermore, the sweep angle of the oscillating arm can vary over time. More particularly, the sweep angle of the oscillating arm can be different during different stages of an agitation profile. The non-uniform motion of the arm in space and time can promote disruption of the seeds to result in consistent and adequate seeding of the target geography.

In an embodiment, the variable sweep angle of the arm increases from stage to stage of the agitation profile. For example, the sweep angle can consistently increase from stage to stage of the agitation profile. Alternatively, the sweep angle may cyclically increase and decrease. For example, the sweep angle may increase from a first stage to a second stage, and then decrease from the second stage to a third stage. Optionally, an oscillatory speed of the arm during each of the stages can vary. In any case, the variation in sweep angle and/or oscillatory speed can disrupt the seeds to reduce the likelihood that the seeds will compress and bind along the sides of the hopper. Accordingly, the sweep agitator can operate with lower power input than is required by conventional agitators. Thus, the target geography can be consistently seeded by driving the agitator using the UAV having limited torque output.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 1 is a perspective view of a planting system, in accordance with an embodiment.

FIG. 2 is a block diagram of a seeding system, in accordance with an embodiment.

FIG. 3 is a cross-sectional view of a seeding system, in accordance with an embodiment.

DETAILED DESCRIPTION

Embodiments describe an agitator for use in a planting system to agitate seeds. The agitator includes one or more oscillating arms to mix and agitate the seeds. The oscillating arms can sweep the seeds toward an outlet of a hopper. Accordingly, the planting system can be used to spread seeds, such as native Australian grass seeds, over a target geography. Although the agitator is mainly described below with respect to agitating seeds in a seed spreader, the agitator may be incorporated in systems used to dispense other particulate matter. For example, the agitator can mix and agitate fertilizer in a hopper of a fertilizer spreader. Thus, reference to the agitator as being a seed agitator, or to the spreading system as being a planting system, is not limiting.

In various embodiments, description is made with reference to the figures. However, certain embodiments may be practiced without one or more of these specific details, or in combination with other known methods and configurations. In the following description, numerous specific details are set forth, such as specific configurations, dimensions, and processes, in order to provide a thorough understanding of the embodiments. In other instances, well-known processes and manufacturing techniques have not been described in particular detail in order to not unnecessarily obscure the description. Reference throughout this specification to "one embodiment," "an embodiment," or the like, means that a particular feature, structure, configuration, or characteristic described is included in at least one embodiment. Thus, the appearance of the phrase "one embodiment," "an embodiment," or the like, in various places throughout this specification are not necessarily referring to the same embodiment. Furthermore, the particular features, structures, configurations, or characteristics may be combined in any suitable manner in one or more embodiments.

The use of relative terms throughout the description may denote a relative position or direction. For example, "distal" may indicate a first direction along a longitudinal axis of an agitator arm. Similarly, "proximal" may indicate a second direction opposite to the first direction. Such terms are provided to establish relative frames of reference, however, and are not intended to limit the use or orientation of a planting system or an agitator to a specific configuration described in the various embodiments below.

In an aspect, an agitator for use in a planting system to mix and agitate seeds is provided. The planting system can spread the seeds over a target geography. For example, the target geography may be a rugged or inaccessible terrain, and thus, the planting system may include an unmanned aerial vehicle (UAV) to carry a hopper containing the seeds and the agitator over the target geography. The UAV may have limited torque output to drive the agitator within the hopper. In an embodiment, the agitator is a sweep agitator having one or more arms that oscillate through a sweep angle in a non-uniform motion, e.g., such that the sweep angle varies over time. The non-uniform motion can disrupt the seeds and reduce the likelihood that the seeds will bind to each other. Accordingly, the agitator can be operated with reduced torque to successfully mix and agitate the seeds. The agitator can sweep the seeds into an outlet of the hopper to successfully reseed the target geography. Given that reduced torque is required to operate the non-uniform motion sweep agitator, the planting system can meet the weight and power constraints incumbent on an airborne platform.

Figure 1:
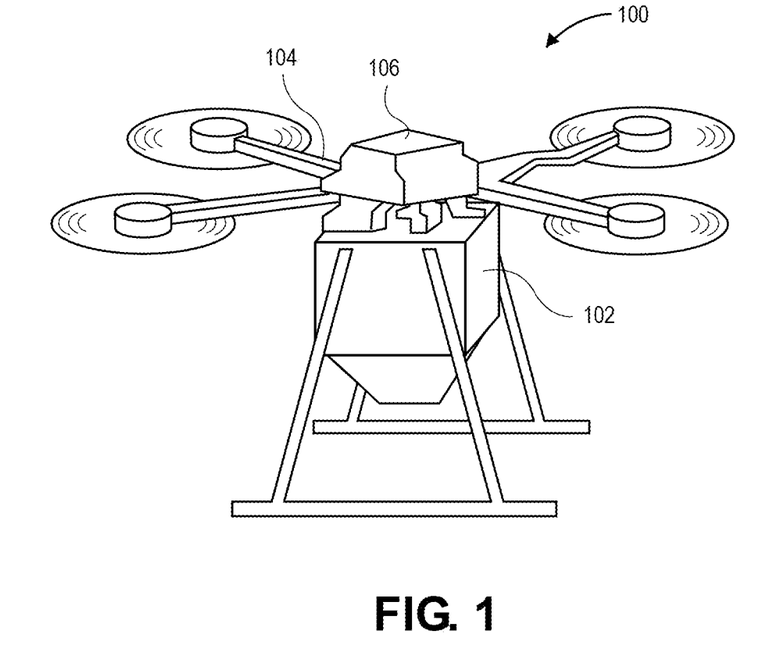

Referring to FIG. 1, a perspective view of a planting system is shown in accordance with an embodiment. The planting system 100 can include a mobile transport system to transport a seeding system over a target geography. The mobile transport system can be a ground-based system, such as a tractor, or an airborne system, such as an unmanned aerial vehicle (UAV) 104. The seeding system can include a hopper 102 that contains seeds to spread over the target geography. Accordingly, the hopper 102 can be mounted on the UAV 104 and the UAV can carry the hopper 102 to spread seeds over the ground as the UAV traverses a planting pattern.

In an embodiment, the UAV 104 is a quadcopter-style UAV or drone. The UAV 104, however, may be another type of UAV, such as a fixed wing drone, rotary-controlled drone, blimp, manually operated plane or helicopter, ultra-lite glider, or other aerial platform. Alternative copter-style drones include drones having a single blade, eight-blades, etc. In the case of a ground-based system, the hopper 102 can be mounted on an automobile, bicycle, motorcycle, hand pushed cart, an animal drawn attachment, a land-based robotic system, or any other ground-based platform.

The hopper 102 can contain a payload that is ready to be dispensed, spread, or planted. The payload can include any particulate that behaves, as a group, as a non-Newtonian fluid. For example, the payload may include agricultural seeds such as millet. Alternatively, the payload can include non-agricultural grass seeds, such as native Australian grass seed. The payload may include particulate that is non-biological. For example, the payload may include fertilizer to be spread over the target geography.

The planting system 100 can include an electronics housing 106 containing electronics to control the operations of the UAV 104 and/or the seeding system carried by the UAV 104. The electronics housing 106 may contain one or more processors that receive inputs from various sensors of the planting system 100. For example, the planting system 100 can include several onboard sensor devices that capture data relating to the position and orientation of the UAV 104. The one or more processors can process the sensor input data to determine outputs for controlling the planting system operation. By way of example, the one or more processors may provide an onboard navigation system that uses data from global positioning system (GPS) or other sensors mounted on the UAV 104 to determine a location of the planting system 100 in relation to the target geography. The planting system 100 can include control software, which when executed by the one or more processors, automates the activities of the aerial and/or land-based mobile transport platform to follow a planting pattern over the target geography.

The electronics module can contain wireless communication hardware, such as a Global System for Mobile Communications (GSM) module (modem to communicate and receive and transmit modes), to allow communication between the planting system 100 and a remote controller.

For example, the communication hardware can connect wirelessly to a ground station or a mobile device. The ground station or the mobile device can be used by an operator to remotely control operation of the mobile transport system and/or the seeding system.

Figure 2:
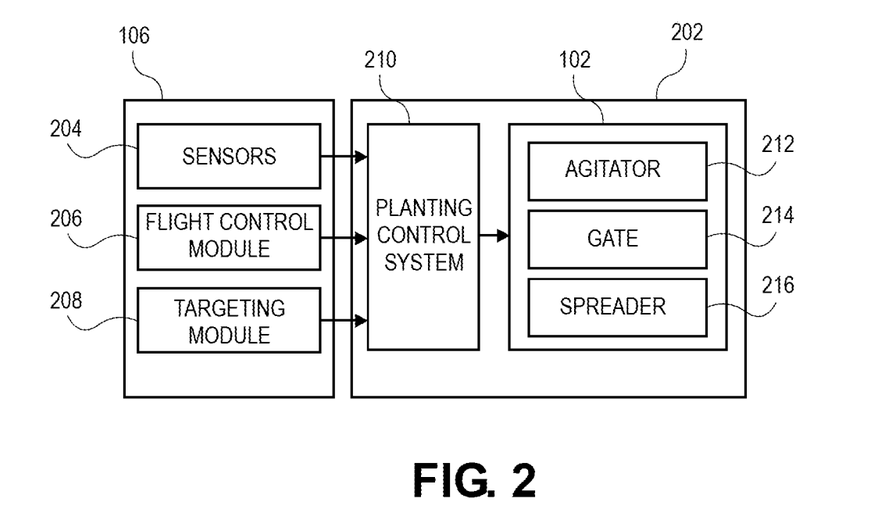

Referring to FIG. 2, a block diagram of a seeding system is shown in accordance with an embodiment. For example, the sensors and modules can be housed in the electronics housing 106. A seeding system 202 functions to spread seeds or other particulate matter over the target geography. The planting system 100 includes one or more sensors 204, a flight control module 206, and the targeting module 208. The sensors 204 can include a GPS module, visual, multispectral, hyperspectral, radar, light imaging detection and ranging (LiDAR), and infrared sensors, and visual cameras which register where seeds are planted and record the surroundings of the planting process. In some embodiments, sensors 204 may include communication modules such as receivers, transmitters, transceivers, etc. The flight control module 206 can include a communications module to obtain flight commands from an operator, other mobile transport platform, or other system. The targeting module 208 can include a communications module to obtain targeting commands from user, other mobile transport platform, or other system.

The sensors and modules can output data to the seeding system 202. The targeting module 208 can automatically send a dispense seed command to a planting control system 210 based on location, e.g., when a current GPS location is within the predefined boundaries of the target geography. In an embodiment, once the planting system 100 is near a predefined location, a live display of the target geography as viewed from the planting system 100 is displayed to a user, enabling the user to manually send the dispense seed command.

The planting control system 210 can manage mixing, agitation, and dispensation of the seeds contained within the hopper 102. As described below, the seeding system 202 can include an agitator 212 to mix and agitate the seeds within the hopper 102. The seeding system 202 can also include a gate 214 to pass the seeds from the hopper 102 to a surrounding environment, and a spreader 216 to spread the seeds onto the ground below the mobile transport system 104. In an embodiment, the planting control system 210, which may include one or more processors executing mixing, agitation, and/or spreading algorithms, can provide outputs to control the mechanical function of the agitator 212, the gate 214, and/or the spreader 216. By way of example, the planting control system 210 can control a sweep angle of an arm of the agitator 212 over time, an opening or closing of the gate 214, or a rotational speed of a disc of the spreader 216.

Figure 3:
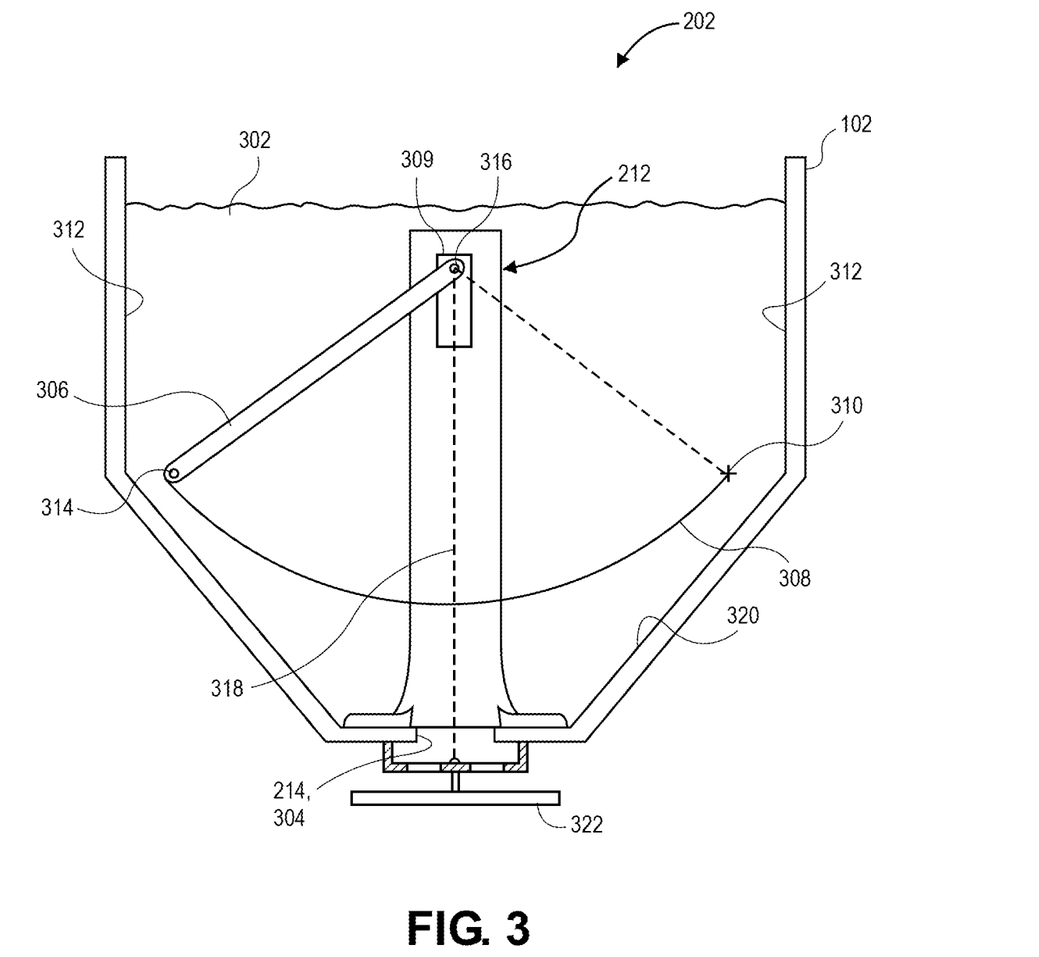

Referring to FIG. 3, a cross-sectional view of a seeding system is shown in accordance with an embodiment. The seeding system 202 includes the hopper 102 to contain seeds 302 or other particular. The seeds, such as native Australian grass seeds, can be dispensed from the hopper 102 into a surrounding environment through an outlet 304 of the hopper 102. For example, the hopper 102 can include an outlet 304, which may include a hole in a bottom wall of the hopper 102, and optionally the gate 214, that can be opened to allow the seeds 302 to flow through the outlet 304 into the surrounding environment.

In an embodiment, the agitator 212 is mounted within the hopper 102. The agitator 212 may be implemented as a sweep agitator 212. More particularly, the agitator 212 can include an arm 306 that oscillates through a sweep angle 308. The arm 306 can be driven by a drive motor 309, which is operably coupled to the arm 306. For example, a proximal end of the arm can be mounted on an output shaft of the motor. As described below, the drive motor 309 can be a servo motor, a stepper motor, or another drive mechanism configured to drive the arm 306 though the sweep angle 308 in a pendulum motion.

As the arm 306 is driven, the arm 306 can be forced through the seeds 302 contained in the hopper 102. The arm 306 can pass over the outlet 304 of the hopper 102. The outlet 304 can be within the sweep angle 308 of the arm 306. More particularly, when viewed in a transverse direction (FIG. 3) the outlet 304 can be within the swept space of the sweep angle 308. The swept space is defined by movement of a longitudinal axis of the arm 306 as a distal end of the arm 306 swings from a first position 310 past the outlet 304 to a second position 314. As the arm 306 swings, the distal end can travel along an arc that subtends the sweep angle 308.

The hopper 102 can be a rectangular hopper having one or more interior sides. For example, the interior surface of the hopper 102 can include vertical interior sides 312. Accordingly, the first position 310 can be near a first vertical interior side of the hopper 102 and the second position 314 can be near a second vertical interior side of the hopper 102.

The arm 306 can pivot through the sweep angle 308 about a pivot point 316. For example, the arm 306 can extend from the proximal end at the pivot point 316 to the distal end below the pivot point 316. The arm 306 can swing back and forth about the pivot point 316 between the first position 310 than the second position 314 through the sweep angle 308. In an embodiment, the sweep angle 308 has a median axis 318 that divide the angle into two half sweep angles. The median axis 318 may be aligned with the outlet 304. More particularly, the median axis 318 may extend downward from the pivot point 316 through the outlet 304 of the hopper 102. Accordingly, when the arm 306 is aligned with the median axis 318 after traversing half of the sweep angle, the arm 306 may extend downward from the pivot point 316 in alignment with the outlet 304.

The interior surface of the hopper 102 can include one or more tapering interior sides 320. The tapering interior sides 320 can taper inward toward the outlet 304. For example, the hopper 102 can have a cubical upper portion and a pyramidal lower portion. An upper end of the tapering interior sides 320 can connect to the vertical interior sides 312 at a location radially outward from the median axis 318, where the upper portion and the lower portion meet. The tapering interior sides 320 can slant downward from the vertical interior sides 312 toward the outlet 304. The tapering interior sides 320 can connect to the bottom wall of the hopper 102 at a location radially (relative to the median axis 318) between the outlet 304 and the location where the tapering interior sides 320 and the vertical interior sides 312 meet.

It will be appreciated that, as the arm 306 sweeps through the sweep angle 308 from the first position 310 to the second position 314, the distal end of the arm 306 will swing over a tapering interior side 320 on a first side of the median axis 318, past the outlet 304, and over a tapering interior side 320 on a second side of the median axis 318. As the arm 306 passes from the first position 310 toward the median axis 318, it can push seeds 302 downward along the tapering interior side 320, causing the seeds 302 to eject through the outlet 304. Likewise, as the arm 306 passes from the median axis 318 toward the second position 314, the arm 306 can pass through and disrupt seeds 302, causing the seeds 302 to mix and fall between the distal end of the arm 306 and the outlet 304. When the arm 306 reaches a limit of the sweep angle 308, the arm 306 can reverse directions to sweep the same area but in the opposite direction. In this manner, the motion is non-uniform in space. More particularly, the arm 306 can operate non-uniformly in space by oscillating to sweep out an angle that is centered on the median axis 318. In an embodiment, the sweep angle 308 is less than 180 degrees. In an embodiment, the sweep angle 308 varies over time. Examples of motion profiles described in more detail below.

As the arm 306 reverses direction to move from the second position 314 to the first position 310, the sequence of ejecting seeds 302 on one side of the median axis 318 and disrupting seeds 302 on the other side of the median axis 318 can continue. With each sweep of the arm 306, seeds 302 are agitated and ejected through the outlet 304. More particularly, as the arm moves seeds downward along the tapering walls, rather than pushing them toward the opposite vertical wall and compressing the seeds 302, the arm 306 can eject the seeds 302 through the outlet 304. Ejection through the outlet 304 can occur when the gate 214 is in an open state. When the gate 214 is in a closed state, the arm 306 can mix seeds 302 within the hopper 102 without ejecting the seeds 302 through the outlet 304. The non-uniform sweeping motion of the arm, which sweeps seeds inward toward the median axis and/or downward toward the outlet, may require less torque as compared to a uniform motion auger, which spins to push seeds laterally outward against the hopper wall.

The aerial spreading system can include the spreader 216. The spreader 216 can include a spreader plate 322 to spread seed 302 horizontally outward relative to the median axis 318. In an embodiment, the spreader plate 322 is rotatably mounted to the hopper 102 below the outlet 304. The gate mechanism can control the output of seeds 302 from the hopper 102 toward the spreader plate 322 below the outlet 304. The rotating spreader plate 322 can thrust the seeds 302 laterally outward, based on a rotational speed of the spreader plate 322. More particularly, the faster the spreader plate 322 spins, the further the seeds 302 may be ejected. Accordingly, the spreader plate rotational speed can be controlled by the planting control system 210 to determine a width of a planting swath as the planting system 100 traverses a planting pattern 922.

Figure 4:
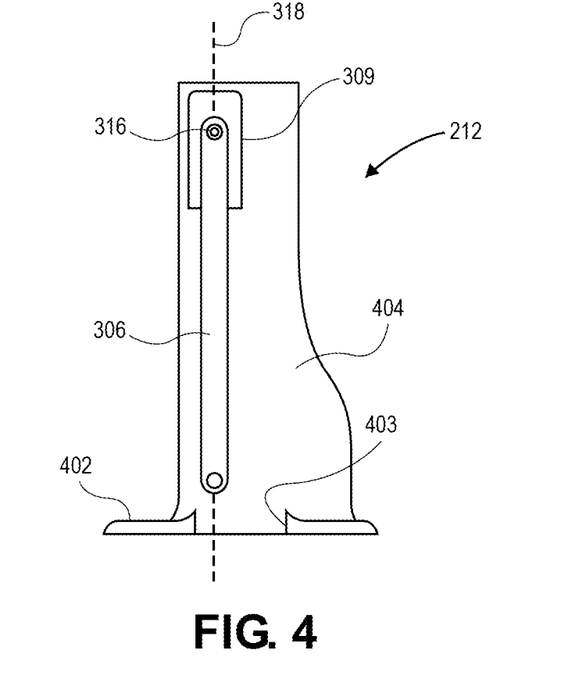
FIG. 4 is a side view of an agitator, in accordance with an embodiment.

Referring to FIG. 4, a side view of an agitator is shown in accordance with an embodiment. Reference geometry of the agitator 212, including certain spatial geometry of each arm 306 of the agitator 212, is described above. Such reference geometry may be used in a variety of structures that agitate, mix, and dispense seeds 302 from the hopper 102. An example of a particular structure of the agitator 212 is now provided.

In an embodiment, the agitator 212 includes a base 402. The base 402 can include a plate or another flat structure extending laterally relative to the median axis 318. The median axis 318 can be a vertical axis, and thus, the base 402 can extend horizontally. The base 402 may have one or more mounting features to allow the base 402 to be coupled to the hopper 102. For example, the base 402 may include one or more mounting holes to receive fasteners that fasten the base 402 to the bottom wall of the hopper 102. In an embodiment, the base 402 can include a base slot 403. The base slot 403 can be a gap in the base 402, e.g., a slot extending from a transverse edge of the base 402 inward toward a column 404. The base slot 403 can be located over the outlet 304 of the hopper 102 to allow seeds 302 to be pushed through the base slot 403 into the outlet 304.

The agitator 212 can include the column 404 extending upward from the base 402. The column 404 can be a rigid structure having a stiffness that supports the arm motion. More particularly, the column 404 may be stiff enough to resist torsion and/or bending moments created by the arm 306 as it oscillates through the sweep angle 308. As described above, the arm 306 can be coupled to the column 404 at the pivot point 316.

Figure 5:
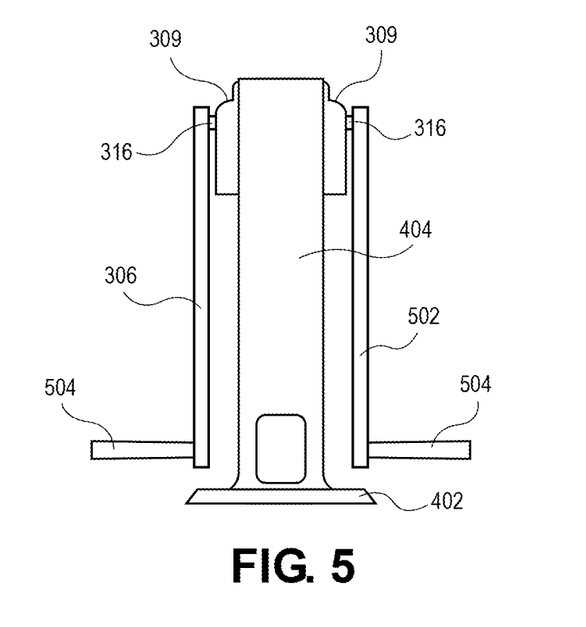
FIG. 5 is a front view of an agitator, in accordance with an embodiment.

Referring to FIG. 5, a front view of an agitator is shown in accordance with an embodiment. Although the above discussion has mainly focused on a single arm of the agitator 212, the arm 306 may be one of several arms. More particularly, the agitator 212 can include several arms, e.g., the arm 306 and a second arm 502. Arm 306 and second arm 502 may be collectively referred to as arms 306 herein. Each of the arms 306 can be pivotably coupled to the column 404 above the base 402. The arms 306 can extend downward from respective pivot points 316 to respective distal ends. Accordingly, the arms 306 can pivot through respective sweep angles 308. More particularly, the arm 306 can sweep through the sweep angle 308, and the second arm 502 can sweep through a second sweep angle 308 (not shown).

Each arm 306 can be operably coupled to a respective drive motor 309. More particularly, one or more drive motors 309 can be operably coupled to the arms 306, and the drive motors 309 may be configured to drive the arms 306 according to respective motion profiles. The motion profiles can be controlled by the planting control system 210, and may be non-uniform in space, e having respective oscillatory sweep angles, and time, e.g., moving through the respective sweep angles that vary over time, as described below.

The agitator 212 may include features to amplify the agitation and mixing of the seeds caused by the pendulum motion of the arms 306. In an embodiment, the agitator 212 includes one or more paddles 504 extending from respective arms 306. For example, the paddles 504 may be elongated bars or plates extending laterally outward from the arms 306. More particularly, the paddles 504 can extend from respective distal ends of the arms 306. The paddles 504 can be cylindrical bars, flattened blades, or any other feature that increases a surface area of the arm 306 structure sweeping through the seeds 302. As the paddles 504 are swept through the seeds 302 by the drive motors 309, the seeds 302 are mixed and moved within the hopper 102.

Figure 6:
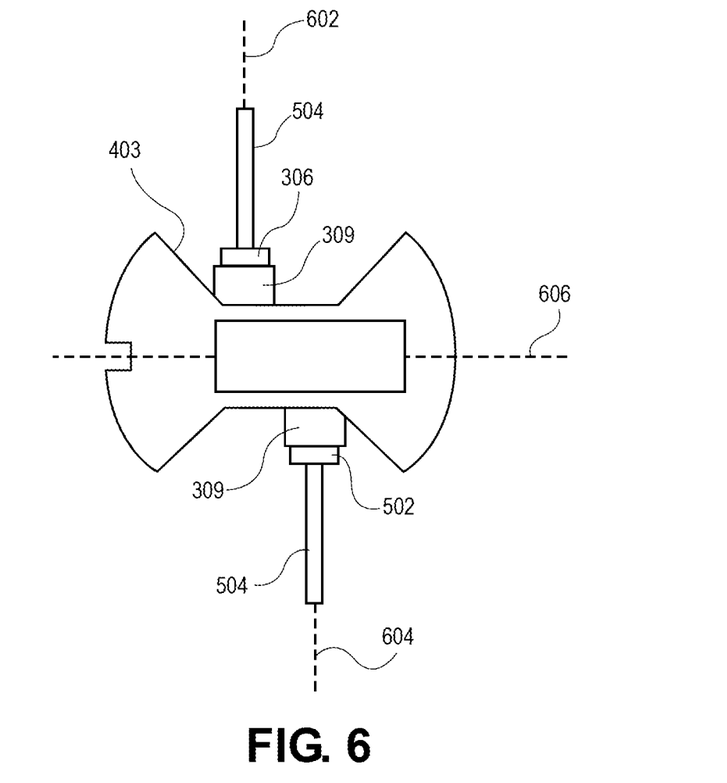
FIG. 6 is a bottom view of an agitator, in accordance with an embodiment.

Referring to FIG. 6, a bottom view of an agitator is shown in accordance with an embodiment. The second sweep angle 308 of the second arm 502, along which the second arm 502 can move the paddle 504, may overlap the sweep angle 308 of the arm 306, along which the arm 306 moves the paddle 504. When viewed in the transverse direction, as shown in FIG. 3, the sweep angles 308 may be identical. More particularly, the arms 306 can have equal lengths and the pivot points 316 can be along a same transverse axis such that the swept arcs of the arms 306 have the same size and location in the transverse view. Accordingly, the outlet 304 may be within both the sweep angle 308 of the arm 306 and the second sweep angle 308 of the second arm 502.

In an embodiment, the swept arcs of the arms 306 may have a same size, however, the arcs can have a different location in the transverse view. For example, the arm 306 may include a paddle 504 that extends in the transverse direction along the first transverse axis 602, and a second arm 502 may include a paddle 504 that extends in the transverse direction along a second transverse axis 604. The first transverse axis 602 and the second transverse axis 604 may be laterally offset from each other in the direction of a lateral axis. For example, the drive motor 309 coupled to the arm 306 can be near a first lateral edge of the column 404, and the drive motor 309 coupled to the second arm 502 can be near an opposite lateral edge of the column 404. As shown, the arms 306 can be on opposite transverse sides of the column 404. The transverse axes may be offset by a lateral distance, and thus, the swept arcs can also be offset by the lateral distance. More particularly, the vertices of the swept arcs can be offset from each other by the lateral distance. The swept arcs may nonetheless overlap when viewed in the transverse direction, however, the arcs may not be identically located. Nonetheless, the outlet 304 may be within both sweep angles 308, as described above.

The arms 306 may be driven through respective sweep angles 308 in a same or opposite direction. More particularly, the paddles 504 of the arms 306 can be simultaneously moved from the first position 310 to the second position 314 to move seeds 302 in a same direction at a same time on opposite sides of the column 404. Alternatively, the paddle 504 of the arm 306 may be driven from the first position 310 to the second position 314 while the second arm 502 is driven from the second position 314 to the first position 310. Accordingly, the paddle 504 of the arm 306 can move seeds 302 in a first direction on a first transverse side of the column 404 while the paddle 504 of the second arm 502 is moving seeds 302 in a second direction on a second transverse side of the column 404. This movement of the arms 306 in opposite directions, e.g., opposite oscillation profiles, can enhance mixing of the seeds 302 within the hopper 102, and thus, may maintain seed dispensation through the outlet 304 over time.

Having discussed the kinematics and certain structural embodiments of the agitator 212 above, motion profiles used to optimize seed agitation shall now be described. The agitator arms 306 may oscillate through respective sweep angles 308 to mix the seeds 302 within the hopper 102. As the paddles 504 sweep downward along the tapering interior sides 320, the seeds 302 can be pushed toward the median axis 318 and toward or through the outlet 304. Seeds that exit the outlet can fall toward the spreader plate 322. Initially, the pendulum motion of the arms 306 can maintain a steady dispensation rate. Under certain circumstances, however, the dispensation rate can decrease and/or stop altogether. For example, when the payload includes seeds having a tendency to stick together, e.g., native Australian grass seed, the seeds 302 can bind to each other. After the seeds 302 within the arc of the arms 306 are ejected from the hopper 102, a vertical shaft of air may remain within the hopper 102. The air shaft can be surrounded by columns of seeds stuck against the vertical interior sides 312. The stuck seeds 302 may be dislodged and ejected by increasing a torque input to the drive motors 309, however, this may drain the limited energy stored by the planting system 100, or exceed the torque capabilities of the system. Accordingly, a motion profile is contemplated that can maintain seed dispensation with reduced torque requirements until all of the seeds 302 are ejected from the hopper 102.

In addition to having non-uniform motion in space (oscillatory versus rotational motion), as described above, the oscillatory motion profiles of the arms 306 may also be non-uniform in time. More particularly, the sweep angle 308 of each arm 306 can change over time. Furthermore, a sweep speed of the arms 306 may vary over time. The combination of non-uniform motion in space and time can reduce the torque requirements of the agitator 212. For example, after the arms 306 have swept the seeds 302 from within a first vertical column of the hopper 102, the sweep angle 308 can be increased to cause the paddles 504 to dislodge seeds 302 that have bound into columns along the vertical interior sides 312. The dislodged seeds 302 can fall downward into the column of air within the hopper 102 to fill the hopper 102 along the tapering interior sides 320. The paddles 504 can then sweep the seeds 302 along the tapering interior sides 320 and out through the outlet 304. Accordingly, the non-uniform motion can reduce the likelihood that the seed mix will compact and bind, and can incrementally dispense seeds 302 from the hopper 102 until all of the seeds 302 are spread. By contrast, a uniform motion agitator, such as a horizontal auger, will compact seeds and may dispense seeds directly over the outlet but will not dispense seeds that bind along the vertical walls of the hopper. Furthermore, the non-uniform motion agitator 212 can dispense the seeds 302 using less torque than the uniform motion agitator 212.

When the sweeping motion of the arms 306 is initially too large, more seeds may be pushed toward the gate 214 by the paddles 504 than the gate can pass. This can lead to compression problems, and more specifically, to seeds quickly binding along the vertical walls of the hopper 102. Accordingly, an initial sweep angle 308 of the non-uniform motion profile may be less than subsequent sweep angles 308 of the profile. The increasing sweep angles 308 over time allows for the motion of the seeds 302 to more closely match the flow capacity of the gate 214, and therefore, increase the likelihood that all seeds 302 will be dispensed from the hopper 102.

Figure 7:
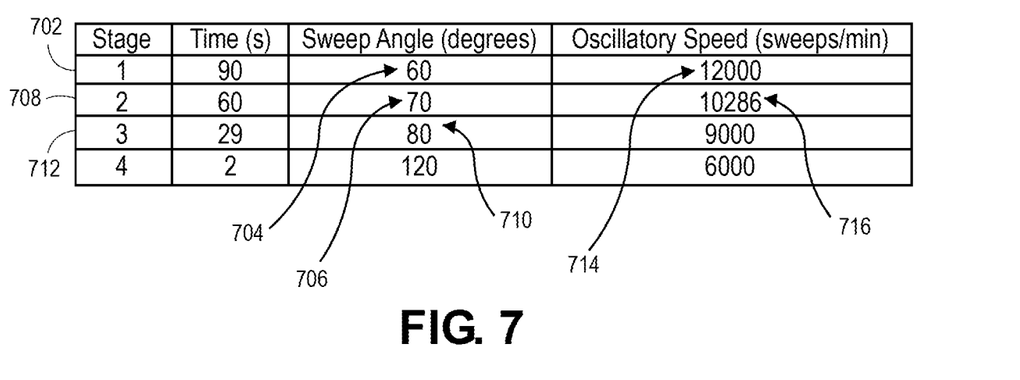
FIG. 7 is a table illustrating an agitation sequence having several stages, in accordance with an embodiment.

Referring to FIG. 7, a table illustrating an agitation sequence having several stages is shown in accordance with an embodiment. The agitation sequence may be part of a motion profile used by the planting control system 210 to control the agitator 212. The table represents an embodiment of the motion profile. The motion profile allows the agitator 212 to deal with seed mixes that have a tendency to bind together. In an embodiment, the respective drive motors 309 are configured to drive the arms 306 during several stages.

A method of agitating seeds 302 can include oscillating the arm 306 of the agitator 212 through the first sweep angle 704 during a first stage 702. Subsequently, the arm 306 can be oscillated through a second sweep angle 706 during a second stage 708. The sweep angles 704, 706 of the first stage 702 and the second stage 708, however, may be different. More particularly, the sweep angle 308 can increase from, e.g., 60 degrees during the first stage 702, to, e.g., 70 degrees during the second stage 708. That is, the sweep angle 308 can be larger during the second stage 708 than during the first stage 702. Accordingly, the sweep angle 308 can increase during one or more subsequent stages following the initial stage. The increase in the sweep angle 308 during each stage of the profile can maximize agitation of the seed mix within the hopper 102.

The method of agitating seeds 302 may include oscillating the arm 306 through a third sweep angle 710 during a third stage 712. The third sweep angle 710 may be different than the second sweep angle 706. For example, the third sweep angle 710 may be larger than the second sweep angle 706. By way of example, the third sweep angle 710 may be 80 degrees, as compared to the second sweep angle 706 of 70 degrees, although these values are provided by way of example and not limitation. As described above, the increased sweep angle 308 can disrupt seeds 302 that are stuck together to promote continued mixing and dispensation of the seeds 302.

The sweep angle 308 may not increase during each subsequent stage. In some embodiments, the sweep angle 308 can be increased in a first subsequent stage, and then reversed to become smaller during a second subsequent stage. For example, the third sweep angle 710 may be larger than the first sweep angle 704 and less than the second sweep angle 706. In such case, the larger second sweep angle 706 can occur temporarily, e.g., over a period of a few seconds, to dislodge seeds 302 into the sweep angle of the third sweep angle 710. The momentary increase in sweep angle 308 can break up the seeds 302 along the vertical walls of the hopper 102 and the smaller sweep angle 308 may then be used to sweep the dislodged seeds 302 through the outlet 304. The motion profile may be a loop in which the sweep angle 308 is increased to dislodge seeds 302 and then decreased to dispense seeds 302, increased again to dislodge seeds 302 and then decreased to dispense seeds 302, and so on.

Whether the motion profile consistently increases the sweep angle 308 from stage to stage, or includes loops having a set of sweep angles and times that cyclically increase and decrease, the sweep angle 308 may trend toward a larger angle over time. For example, the sweep angle 308 can be 60 degrees during an initial stage and 120 degrees during a final stage, and the sweep angle 308 may increase and/or decrease during different periods of time between those stages.

The planting control system 210 may also alter sweep speed during the mixing process. The sweep speed may be measured in a number of sweeps per unit time. For example, the arm 306 can have a first oscillatory speed 714 during the first stage 702 and a second oscillatory speed 716 during the second stage 708. The first oscillatory speed 714 may have a value of 12000 sweeps per minute, meaning that the distal end of the arm 306 sweeps through the sweep angle 308 (from the first position 310 to the second position 314 or from the second position 314 to the first position 310) 12000 times in 1 minute. The second oscillatory speed 716 can be different than the first oscillatory speed 714.

It will be appreciated that the change in oscillatory speed may be directly proportional to the change in sweep angle 308. For example, the sweep angle 308 may vary and change from stage to stage, however, the arm 306 may move with a constant angular speed during each of the stages. For example, the servo motors may drive the arms 306 at a rate of 60 degrees per 0.3 seconds during one or more stages of the agitation sequence. Given that the angular speed is constant and the sweep angle 308 is changing, the oscillatory speed as measured in sweeps per minute will be inversely proportional to a size of the sweep angle 308. Accordingly, the first oscillatory speed 714 may be greater than the second oscillatory speed 716 because the first sweep angle 704 is less than the second sweep angle 308. In an embodiment, the second oscillatory speed 716 is 10286 sweeps per minute, as compared to the first oscillatory speed 714 of 12000 sweeps per minute. The larger number of sweeps per unit time during the initial stage is a function of having a smaller angle initially.

In an embodiment, the angular speed of the arms 306 may be varied during one or more of the sequence stages. The angular speed can vary from stage to stage. For example, the angular speed can be increased during the second stage 708 to cause the second oscillatory speed 716 to equal the first oscillatory speed 714. More particularly, as the sweep angle 308 increases from 60 degrees in the first stage 702 to 70 degrees in the second stage 708, the angular speed of the arms 306 may be increased such that the oscillatory speeds of both stages is 12000 sweeps per minute.

The angular speed may also vary within a stage. For example, the drive motor 309 may accelerate the arm 306 from the first position 310. The arm 306 can reach a first angular speed prior to passing over the gate 214, and may then accelerate or decelerate to a second angular speed after passing over the gate 214. The arm 306 can finally be decelerated to the second position 314 at which point motion of the arm 306 is reversed to return to the first position 310. In an embodiment, the angular speed of the arm 306 is faster as it passes over the gate 214 and slower as it moves from the gate 214 to the second position 314. Such a motion profile can increase the force applied to the seeds 302 during an ejection phase of the oscillation (before passing the gate 214) while using less torque and therefore saving energy during the mixing phase of the oscillation (after passing the gate 214). Other motion profiles to optimize energy usage, mixing, and ejection rate may be contemplated within the scope of this description.

Still referring to FIG. 7, as shown, the first stage 702 may occur for a first period of time, e.g., 90 seconds. The duration of the second stage 708 may be different than the duration of the first stage 702, and the duration of the third stage 712 may be different than the duration of the second stage 708. For example, the second stage 708 may occur for a second period of time, e.g., 60 seconds, and the third stage 712 may occur for a third period of time, e.g., 29 seconds. Each stage may be shorter than the preceding stage, or at least, may have a respective duration tuned to the seed mixing and ejection of the particular stage. For example, the first stage 702 may continue until the seed dispensation slows or stops, indicating that the seeds 302 are binding within the hopper 102, and then the motion profile may advance to the next stage. The second stage 708 may continue until the seed dispensation slows or stops, indicating that the seeds 302 are binding within the hopper 102, and then the motion profile may advance to the next stage.

The length of time for seed dispensation to slow or stop during each stage may depend on variables such as the seed type or a mixture of seed types. Accordingly, the stage lengths or durations may be determined empirically by running each stage until the seeds 302 in the vicinity of the outlet 304 are completely cleared, i.e., an air shaft exists over the outlet 304 and few or no seeds are being dispensed. The determined time can be the duration of the observed stage. The sweep angle 308 can be increased to reinitiate flow of the seeds 302 and the dispensation rate can be observed until the seeds are again cleared above the outlet 304. The observed duration can be a length of the observed stage. The process can be continued until all seeds 302 are emptied from the hopper 102. Therefore, the stage durations can be empirically derived.

Although the stage durations can be empirically derived to develop a motion profile for automatically spreading seeds 302, natural variations in the seed mixture may cause the dispensation of seeds to slow or stop prior to an end of the stage. For example, 40 seconds into the 60 second long second stage 708, the seeds 302 in the hopper 102 may become compacted and stop flowing through the gate 214. The planting system 100 could travel for an additional 15 seconds prior to the next stage restarting the flow of seeds 302, and thus, planting may be inconsistent. To avoid the likelihood of inconsistent seed spreading, the planting control system 210 can iterate to the next stage in the sequence manually or automatically.

An operator can manually iterate to the next stage. The operator can remotely control the planting system 100. For example, a pilot can fly the UAV 104 over the target geography using a radio controlled handset or mobile device. In an embodiment, the control device may have a physical or virtual toggle to allow the operator to provide an input to advance the sequence to the next stage. More particularly, the user can actuate the toggle to provide a preemption command that indicates to the planting control system 210 that seeds are no longer flowing through the outlet 304 of the hopper 102. The operator may detect this visually. The planting control system 210 may receive the preemption command, and in response to the input, advance the control algorithm to a next stage in the sequence. For example, the planting system 100 can advance the arm 306 from the first stage 702 to the second stage 708. The sweep angle 308 of the arms 306 in the second stage 708 may increase, as described above, to disrupt the seeds 302 and restart flow of the seeds 302 through the gate 214. Accordingly, the preemption command allows the operator to adapt the mixing sequence to operational needs.

In an embodiment, the preemption mechanism can send a trigger automatically. For example, the planting system 100 may include one or more sensors 204, such as proximity sensors, cameras, etc., that monitor dispensation of the seeds 302 through the outlet 304. The sensors can detect that the flow of the seeds 302 has slowed or stopped, and in response, can provide the preemption command to the planting control system 210. The planting control system 210 can advance the sequence to the next stage to ensure that the seeds 302 keep flowing through the outlet 304.

Figure 8:
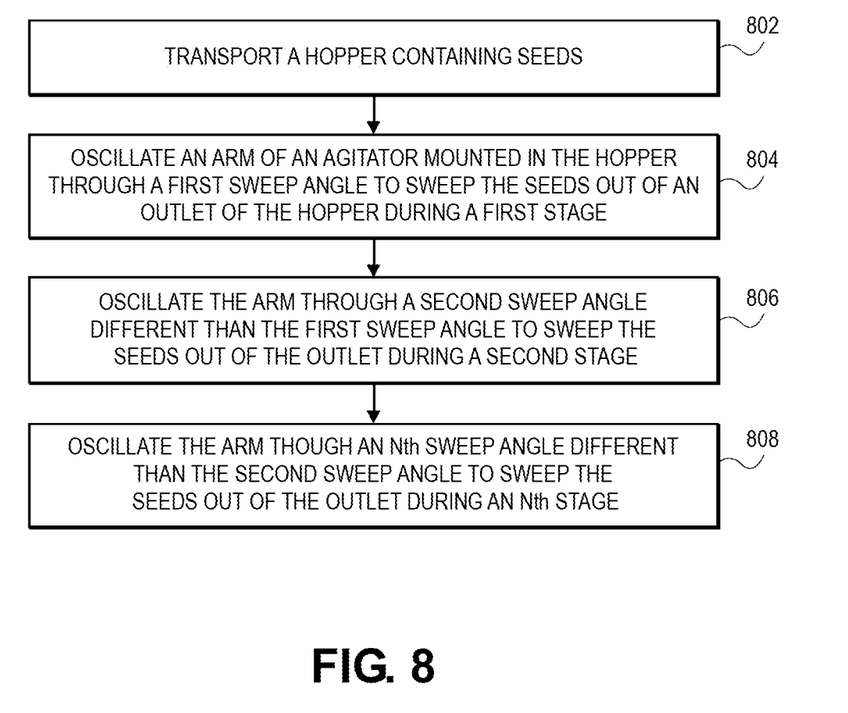
FIG. 8 is a flowchart of a method of agitating seeds in a hopper, in accordance with an embodiment.

Referring to FIG. 8, a flowchart of a method of agitating seeds in a hopper is shown in accordance with an embodiment. At operation 802, the hopper 102 can be transported to carry seeds 302 over the target geography. For example, the UAV 104 can transport the hopper 102 containing seeds 302 through the air over the target geography. As described above, the agitator 212 can be mounted in the hopper 102 to mix and dispense seeds 302. More particularly, the arm 306 can oscillate within the hopper 102 to sweep the seeds 302 out of the outlet 304 during one or more stages of the mixing sequence.

As described above, the mixing sequence can have several stages. At operation 804, during the first stage 702, the arm 306 can oscillate through the first sweep angle 704 to sweep the seeds 302 out of the outlet 304. When the flow of seeds 302 through the outlet 304 slows or stops, the mixing sequence can advance to the second stage 708. At operation 806, during the second stage 708, the arm 306 can oscillate through the second sweep angle 706 different than the first sweep angle 704 to sweep the seeds 302 out of the outlet 304. When the flow of seeds through the outlet 304 slows or stops, the mixing sequence can advance to a next stage, then a next stage, and so on. For example, at operation 808, during an Nth stage, the arm 306 can sweep oscillate through an Nth sweep angle different than the second sweep angle 706 to sweep the seeds 302 out of the outlet 304. As the seeds 302 are mixed and dispensed through the outlet 304, the ejected seeds 302 can be flung radially outward by the spreader plate 322. Accordingly, the planting system 100 can spread seeds 302 over the target geography.

Figure 9:
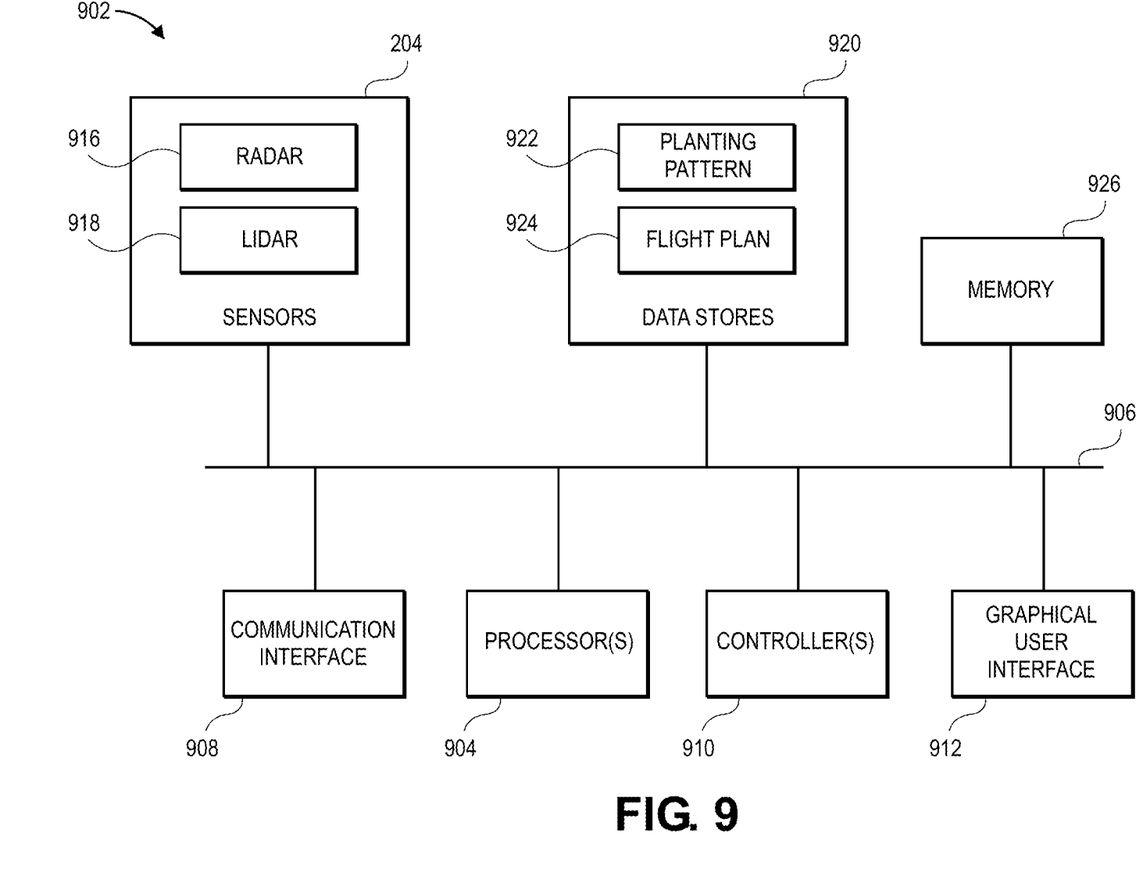
FIG. 9 is a block diagram of a computer system, in accordance with an embodiment.

Referring to FIG. 9, a block diagram of a computer system is shown in accordance with an embodiment. A computer system 902 can include the planting control system 210 to implement the mixing and spreading methods described above. More particularly, the computer system 902 can perform computer implemented methods that effect the mixing and spreading methods described above. In an embodiment, one or more processors 904 of the computer system 902 can execute instructions stored on a non-transitory computer readable medium to cause the planting system 100 to perform the mixing and spreading methods.

The computer system 902 can include hardware elements connected via a bus 906, including a network interface 908, that enables the computer system 902 to connect to other computer systems over a local area network (LAN), wide area network (WAN), mobile network (e.g., EDGE, 3G, 4G, or other mobile network), or other network. Communication interface 908 can further include a wired or wireless interface for connecting to infrared, Bluetooth, or other wireless devices, such as other mobile transport platforms. The computer system 902 can include the one or more processors 904, such as a central processing unit (CPU), field programmable gate array (FPGA), application-specific integrated circuit (ASIC), network processor, or other processor. Processors 904 may include single or multi-core processors.

In some embodiments one or more controllers 910 can be used to control the navigation of the mobile transport platform. The controllers may include hardware and software controllers 910 designed to control the various mobile transport platforms described herein. In some embodiments, the computer system 902 can include a graphical user interface (GUI) 912. The GUI can connect to a display (LED, LCD, tablet, touchscreen, or other display) to output user viewable data. In some embodiments, the GUI can be configured to receive instructions, e.g., through a touchscreen or other interactive interface.

In some embodiments one or more sensors 204 can be used to navigate and to gather data describing the surrounding area that can be used to create a map of local land characteristics. In some embodiments, the sensors 204 can include various electromagnetic sensors such as visual, multispectral, hyperspectral, RADAR 916, LiDAR 918, and infrared sensors. In some embodiments, the sensors 204 can include various communication modules such as GPS or other positioning modules and mobile network communication modules.

In some embodiments, the computer system 902 may include local or remote data stores 920. Data stores 920 can include various computer readable storage media, storage systems, and storage services, such as disk drives, CD-ROM, digital versatile disc (DVD), or other optical storage, magnetic cassettes, magnetic tape, magnetic disk storage or other magnetic storage devices, relational databases, object storage systems, local or cloud-based storage services, or any other storage medium, system, or service. The data stores 920 can include data generated, stored, or otherwise utilized as described herein. For example, the data stores 920 can include all or portions of planting patterns 922 and flight plans 924, generated and stored for reference to navigate the planting system 100 to the target geography. Memory 926 can include various memory technologies, including RAM, ROM, EEPROM, flash memory or other memory technology. Memory 926 can include executable code to implement methods as described herein.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A planting system, comprising:
    an unmanned aerial vehicle (UAV);
    a hopper mounted on the UAV, wherein the hopper includes an outlet;
    an agitator mounted within the hopper and including an arm to oscillate through a sweep angle, wherein the outlet is within the sweep angle; and
    a drive motor operably coupled to the arm to drive the arm back and forth through the sweep angle.

2. The planting system of claim 1, wherein the agitator includes a second arm to sweep through a second sweep angle, and wherein the outlet is within the second sweep angle.

3. The planting system of claim 1, wherein the drive motor is configured to drive the arm through the sweep angle during a first stage and a second stage, and wherein the sweep angle is different during the first stage than during the second stage.

4. The planting system of claim 1 further comprising a paddle extending from the arm.

5. The planting system of claim 1, wherein the sweep angle has a median axis, and wherein the outlet is aligned with the median axis.

6. The planting system of claim 1, wherein the hopper includes one or more interior sides tapering inward toward the outlet, and wherein the sweep angle extends over the one or more interior sides.

7. The planting system of claim 1 further comprising a spreader plate rotatably mounted to the hopper below the outlet.

8. An agitator, comprising:
    a base;
    a column extending upward from the base;
    a plurality of arms pivotably coupled to the column above the base, wherein the plurality of arms extend downward from respective pivot points to respective distal ends and oscillate back and forth through respective sweep angles; and
    one or more drive motors operably coupled to the plurality of arms to drive the arms back and forth through the respective sweep angles.

9. The agitator of claim 8 further comprising one or more paddles extending from the respective distal ends of the plurality of arms.

10. The agitator of claim 8, wherein the one or more drive motors are configured to drive the plurality of arms through the respective sweep angles during a first stage and a second stage, and wherein the respective sweep angles are different during the first stage than during the second stage.

11. The agitator of claim 10, wherein the respective sweep angles are larger during the second stage than during the first stage.

12. A method, comprising:
    transporting, by an unmanned aerial vehicle (UAV) of a planting system, a hopper containing a plurality of seeds;
    oscillating, by one or more drive motors of thea planting system, an arm of an agitator mounted in the hopper of the planting system back and forth through a first sweep angle to sweep the plurality of seeds out of an outlet of the hopper during a first stage; and
    oscillating, by the one or more drive motors, the arm back and forth through a second sweep angle different than the first sweep angle to sweep the plurality of seeds out of the outlet during a second stage.

13. The method of claim 12, wherein the second sweep angle is larger than the first sweep angle.

14. The method of claim 12 further comprising oscillating the arm back and forth through a third sweep angle different than the second sweep angle during a third stage.

15. The method of claim 14, wherein the third sweep angle is larger than the second sweep angle.

16. The method of claim 14, wherein the third sweep angle is larger than the first sweep angle and less than the second sweep angle.

17. The method of claim 12, wherein the arm has a first oscillatory speed during the first stage and a second oscillatory speed during the second stage, and wherein the first oscillatory speed is greater than the second oscillatory speed.

18. The method of claim 12 further comprising:
    receiving a preemption command; and
    advancing the arm from the first stage to the second stage in response to the preemption command, wherein the second sweep angle is larger than the first sweep angle.

* * * * *